(12) United States Patent
Gauf et al.

(10) Patent No.: US 11,822,446 B2
(45) Date of Patent: Nov. 21, 2023

(54) AUTOMATED TESTING METHODS FOR CONDITION ANALYSIS AND EXPLORATION

(71) Applicant: Innovative Defense Technologies, LLC, Arlington, VA (US)

(72) Inventors: Bernard Gauf, Vienna, VA (US); Apostolos Topalis, Mullica Hill, NJ (US); Jacob Harris, Delran, NJ (US)

(73) Assignee: Innovative Defense Technologies, LLC, Arlington, VA (US)

( * ) Notice: Subject to any disclaimer, the term of this patent is extended or adjusted under 35 U.S.C. 154(b) by 38 days.

(21) Appl. No.: 17/683,672

(22) Filed: Mar. 1, 2022

(65) Prior Publication Data

US 2022/0283919 A1    Sep. 8, 2022

Related U.S. Application Data

(60) Provisional application No. 63/155,457, filed on Mar. 2, 2021.

(51) Int. Cl.
*G06F 11/36* (2006.01)
*G06F 11/263* (2006.01)
*G06F 11/34* (2006.01)

(52) U.S. Cl.
CPC ........ *G06F 11/263* (2013.01); *G06F 11/3409* (2013.01); *G06F 11/3692* (2013.01)

(58) Field of Classification Search
CPC ............... G06F 11/263; G06F 11/3676; G06F 11/3692; G06F 11/3668
See application file for complete search history.

(56) References Cited

U.S. PATENT DOCUMENTS

| | | | |
|---|---|---|---|
| 8,826,084 B1 * | 9/2014 | Gauf | G06F 11/3684 714/46 |
| 9,135,714 B1 | 9/2015 | Gauf et al. | |
| 9,983,965 B1 | 5/2018 | Gauf et al. | |
| 10,394,700 B1 * | 8/2019 | Unsal | G06F 11/3676 |
| 10,678,666 B1 | 6/2020 | Gauf et al. | |
| 10,678,678 B1 * | 6/2020 | Tsoukalas | G06F 11/3664 |
| 11,010,286 B1 * | 5/2021 | Goksu | G06F 11/3688 |
| 2004/0153776 A1 * | 8/2004 | Rhea | G06F 11/0769 714/E11.182 |
| 2014/0365830 A1 * | 12/2014 | Rajan | G06F 11/3684 714/38.1 |
| 2019/0213115 A1 * | 7/2019 | Takawale | G06F 11/3692 |
| 2020/0183812 A1 * | 6/2020 | Eberlein | G06F 11/3664 |
| 2020/0394125 A1 * | 12/2020 | Hicks | G06N 5/022 |
| 2021/0026761 A1 * | 1/2021 | Duffy | G06F 11/368 |

* cited by examiner

*Primary Examiner* — Yolanda L Wilson
(74) *Attorney, Agent, or Firm* — Hunton Andrews Kurth LLP

(57) ABSTRACT

An embodiment of the present invention is directed to a novel approach of applying Machine Learning, statistical methods and/or other algorithms to identify associations of input conditions and values with results of requirements, measures of performance assessments, and/or other indications. These associations may be provided to an analyst, system designer, other recipient and/or receiving system or component to inform of input conditions and values that uncover system sensitivities.

18 Claims, 4 Drawing Sheets

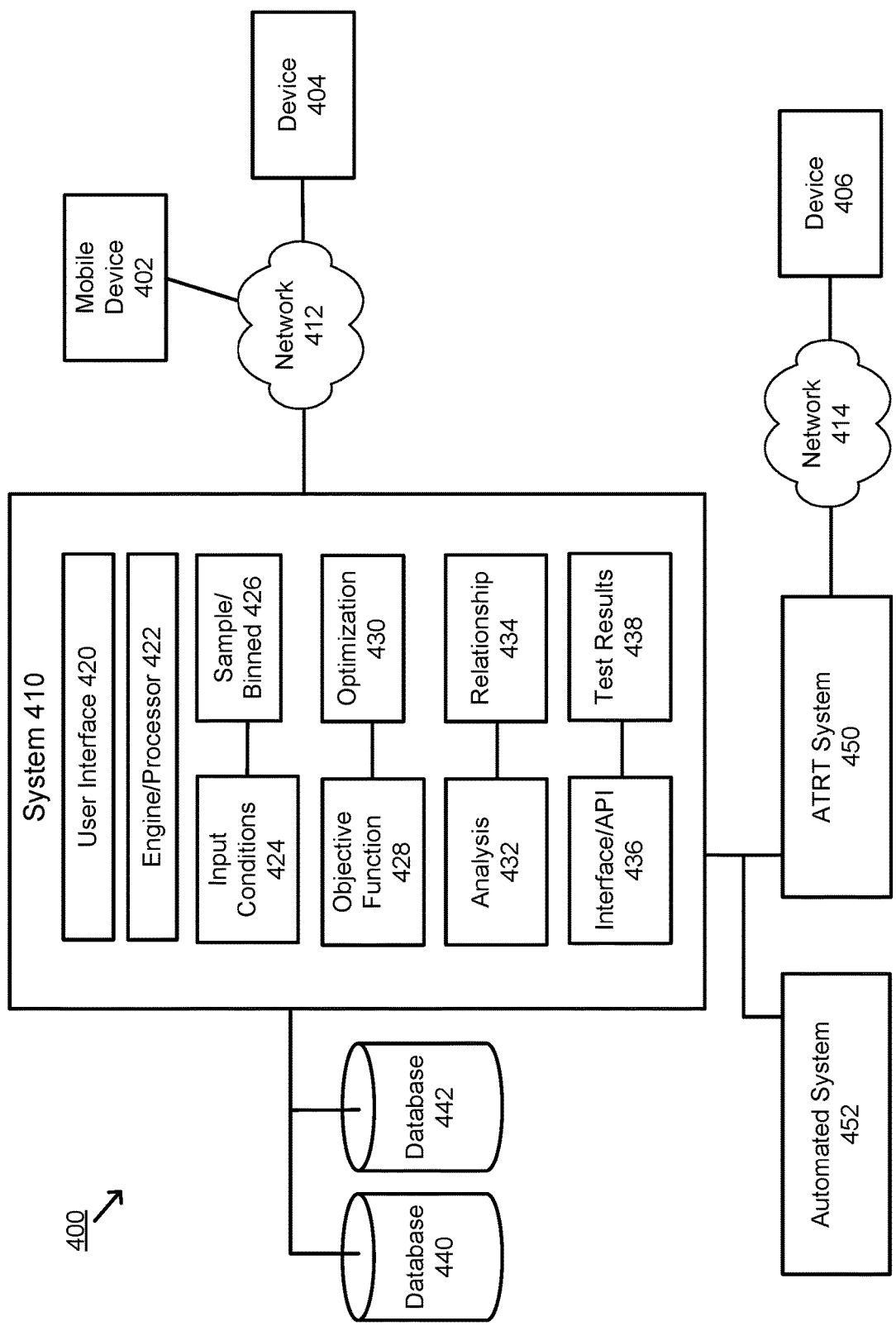

AUTOMATED TESTING METHODS FOR CONDITION ANALYSIS AND EXPLORATION

CROSS REFERENCE TO RELATED APPLICATIONS

This application claims priority to U.S. Provisional Application 63/155,457, filed Mar. 2, 2021, the contents of which are incorporated by reference herein in their entirety.

This application relates to U.S. Pat. No. 8,826,084 (entitled "Method and System for implementing Automated Test and Retest Procedures"), U.S. Pat. No. 9,135,714 (entitled "Method and System for Integrating a Graphical User Interface Capture for Automated Test and Retest Procedures"), U.S. Pat. No. 9,983,965 (entitled "Method and System for Implementing Virtual Users for Automated Test and Retest Procedures") and U.S. Pat. No. 10,678,666 (entitled "Method and System for Implementing Automated Test and Retest Procedures in a Virtual Test Environment"), the contents of which are incorporated by reference herein in their entirety.

FIELD OF THE INVENTION

The present invention relates generally to automated testing and more specifically to a method and system for implementing automated testing for condition analysis and exploration.

BACKGROUND OF THE INVENTION

Advancements in automated testing and analysis techniques such as Automated Test and Re-Test (ATRT), as described in U.S. Pat. Nos. 8,826,084; 9,135,714; 9,983,965 and 10,678,666, have enabled the continuous evaluation of complex software providing requirements and performance assessments throughout the development and lifecycle of a system. The complex systems under test that operate in real-world environments can be presented an infinite number of input conditions during execution.

A motivation behind testing a software system is to find failures and build confidence that the system is robust against all possible input conditions. Failures due to a specific combination of input conditions can be communicated to system designers and then addressed in subsequent builds of a system being developed. Since it is impossible to test every combination of this infinite input condition space, a more tractable solution is required.

Binning techniques are typically employed to limit this infinite space. As an example, considering 12 conditions divided into 20 bins the permutations of sampling can easily reach test instances in the quadrillions. Because there are finite testing resources and limited time to test a particular build of a system, a novel approach is required to more efficiently drive automated test and analysis.

These and other drawbacks exist.

SUMMARY OF THE INVENTION

According to an embodiment of the present invention, a system implements condition analysis and exploration workflow. The system comprises: a memory component; and a computer server coupled to the memory component, the computer server comprising a programmed computer processor configured to perform the steps of: defining a set of input conditions and value ranges to drive execution of one or more automated tests; initiating execution of a series of test runs using the set of input conditions and the value ranges on an automated testing suite of tools; using test results of the execution of the series of test runs, generating assessments relating to one or more requirements and measures of performance; recording, via the memory component, the assessments and the set of input conditions; applying an iterative optimization algorithm to analyze an objective function and derive a next set of condition values; and performing analysis to identify one or more relationships between the set of input conditions and the test results.

According to an embodiment of the present invention, a method implements condition analysis and exploration workflow. The method comprises the steps of: defining, via a computer processor, a set of input conditions and value ranges to drive execution of one or more automated tests; initiating, via the computer processor, execution of a series of test runs using the set of input conditions and the value ranges on an automated testing suite of tools; using test results of the execution of the series of test runs, generating assessments relating to one or more requirements and measures of performance; recording, via a memory component, the assessments and the set of input conditions; applying, via the computer processor, an iterative optimization algorithm to analyze an objective function and derive a next set of condition values; and performing, via the computer processor, analysis to identify one or more relationships between the set of input conditions and the test results.

An embodiment of the present invention is directed to an automated testing system and method for condition analysis and exploration. The present invention identifies associations of input conditions and values with results of requirements, measures of performance assessments and/or other analytics and determinations. These associations may then be used to identify system sensitivities and/or other characteristics. Moreover, associations may be further used to explore input condition space based on a predetermined objective and/or other goal. According to an embodiment of the present invention, known input conditions and test results may be used to derive test conditions using an optimization approach to efficiently and accurately identify conditions and tests to run to identify software errors and associated factors.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 is an exemplary system diagram, according to an embodiment of the present invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a novel approach of applying Machine Learning, statistical methods and/or other algorithms to identify associations of input conditions and values with results of requirements, measures of performance assessments, other characteristics and/or indications. These associations may be provided to an analyst, system designer, other recipient and/or receiving system or component to inform of input conditions and values that uncover system sensitivities and detect other performance issues and system operations.

According to another embodiment, in an automated execution environment, these associations may be used to explore the input condition space based on a defined objective. Traditional automation generally samples the input condition space through a sampling scheme or target requirement coverage as a means by which subsequent test instances may be selected. A novelty in this approach leverages the results of previous test instances as a source of information provided to an algorithm to explore the condition space of subsequent runs governed by an overall objective. In other words, the innovation closes the automated test execution loop by strategically exploring the input condition space based on test results using an optimization algorithm.

Figure 1:
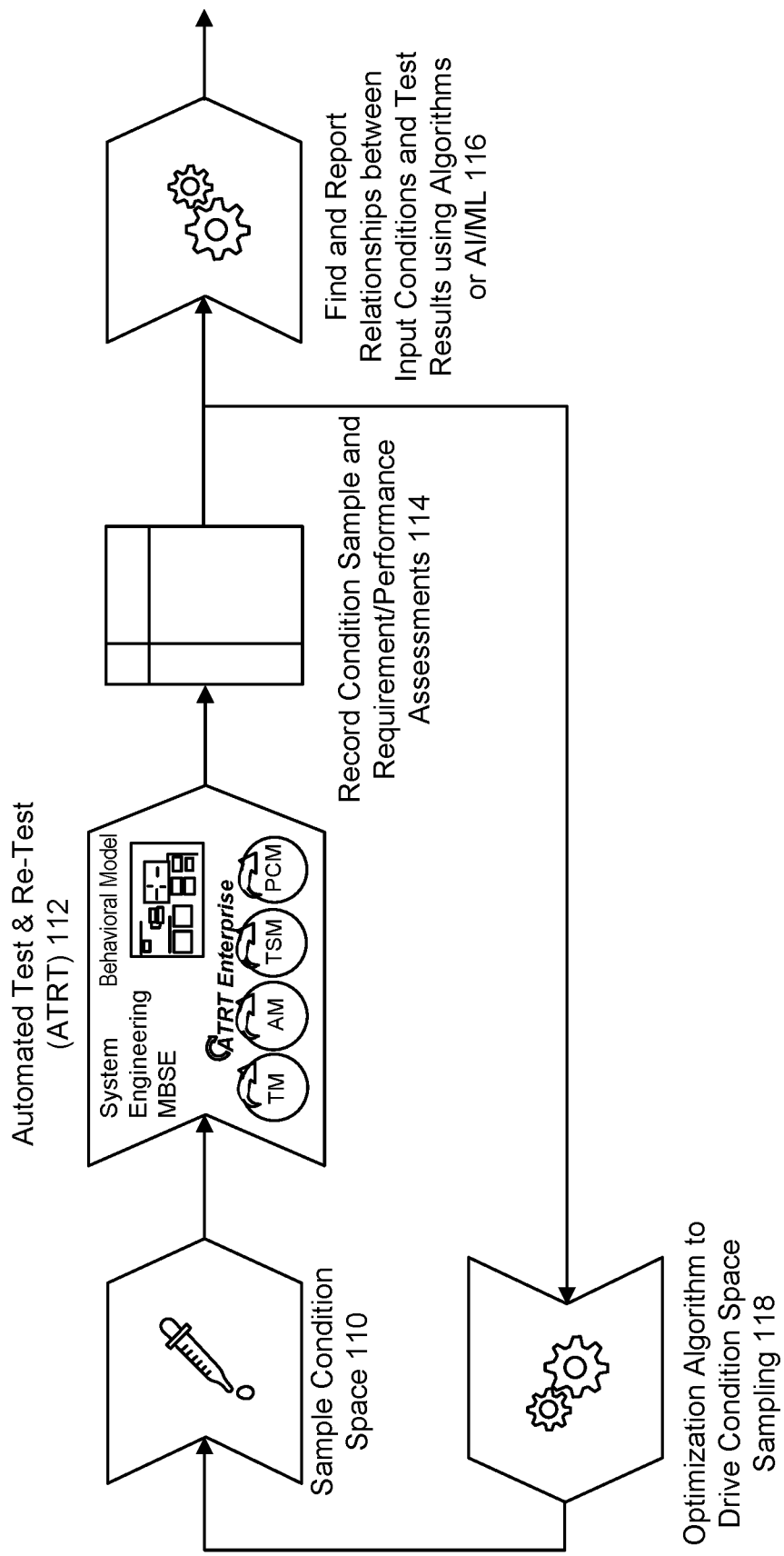
FIG. 1 is an exemplary diagram, according to an embodiment of the present invention.

FIG. 1 illustrates an exemplary condition analysis and exploration workflow enabled by automated test and analysis technologies. A set of conditions and value ranges may be initially defined to drive the execution of automated tests. Conditions may include a variety of types such as continuous, discrete and/or categorical variables. For example, continuous variables may be binned to create a finite set of regions to analyze and report on uncovered relationships. The condition space may be sampled as shown by 110. The sample sets may be processed by an automated testing suite of tools to execute a series of test runs, as shown by 112. The automated testing suite of tools may include automated testing and analysis techniques such as Automated Test and Re-Test (ATRT) systems, as described in U.S. Pat. Nos. 8,826,084; 9,135,714; 9,983,965 and 10,678,666. ATRT 112 may include Model Based System Engineering (MBSE) and further support/execute Behavior Models. ATRT 112 may include functions, modules and/or other components and subsystems represented by Test Manager (TM), Analysis Manager (AM), Test Strategy Manager (TSM) and Persistent Configuration Manager (PCM). The results of these runs may be analyzed to assess requirements, measures of performance and/or determine other metrics and analytics.

As shown by 114, assessments may be recorded along with the set of condition values used to execute the test. As assessments are collected, a follow-on analysis may be conducted to find and report on the relationships between input conditions and test results using algorithms, artificial intelligence/machine learning, and/or mathematical techniques, as shown by 116. Exposed relationships may be used by system designers (or other recipients or receiving systems) to account for combinations of input conditions resulting in unexpected system behavior or other event. Additionally, an overall objective may be defined that governs the selection of input condition sample sets. For instance, a combination of input condition values, which result in a large number of failures, may be considered an important objective when testing software systems. At 118, an optimization algorithm may be tasked to converge on the solution that meets this objective. As shown in FIG. 1, an algorithm driving condition space sampling may be informed by the test results and the input condition values corresponding with those results.

According to an embodiment of the present invention, several techniques may be used to identify relationships between the input conditions and test results. For example, algorithms may identify the important conditions that are associated with requirement/performance assessment results. These include but are not limited to Logistic Regression and Mutual Information. Furthermore, important condition values may be identified with binned variants of these algorithms in addition to Association Rules. Association Rules may represent rule-based machine learning methods for discovering interesting or notable relations between variables in large datasets. Relationships between input conditions and test results may vary in complexity. For example, a particular failure may occur when a single input condition is above or below a certain value. In addition, a failure may be associated with multiple conditions and/or a disjointed range of values across multiple conditions. Relationships may also be probabilistic. In this example, when a certain condition value is approached, the likelihood of a particular result increases. Thus, the algorithm or method used to capture this and other relationships may support these and other types of complexity.

Figure 2:
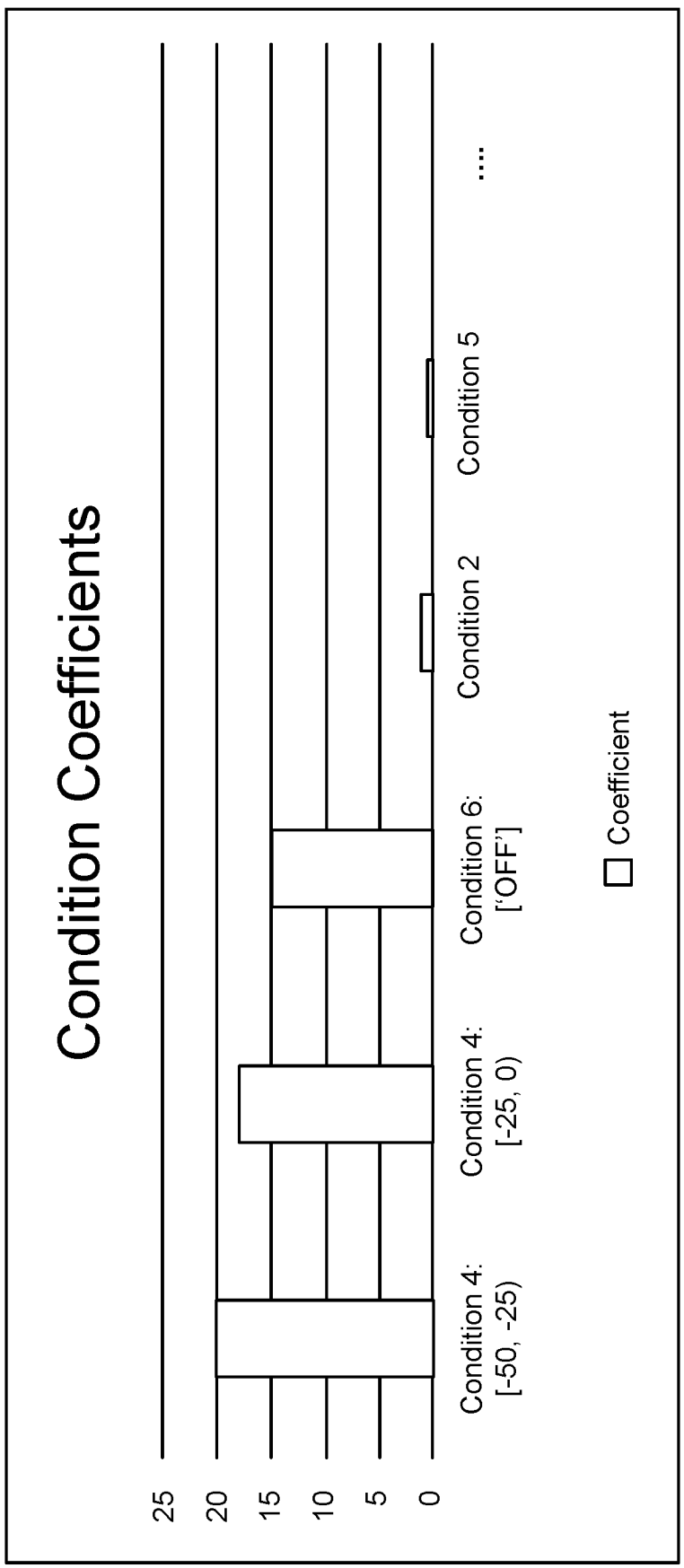
FIG. 2 is an exemplary chart illustrating condition coefficients, according to an embodiment of the present invention.

FIG. 2 is an exemplary chart illustrating condition coefficients, according to an embodiment of the present invention. FIG. 2 illustrates a graph of relative importance of a subset of binned conditions. In this example, condition 4 [−50,−25) and condition 6 ['OFF'] coefficients suggest a higher importance than the other conditions analyzed. Although, Condition 4 was divided into several bins prior to the condition analysis, two adjacent bins were found to be associated with a test result in this example.

Exploring the input condition space typically occurs using a sampling scheme such as Grid or Random sampling and are primarily driven by coverage of the input condition space. These approaches limit condition combinations but do not guarantee any objective is reached. According to an embodiment of the present invention, a novelty in this approach applies an iterative optimization algorithm to analyze the objective function at each step and derive a set of condition values to explore in the next iteration. The number of explored combinations may be primarily driven by the sampling scheme and/or the shape of the objective function as well as the associated optimization algorithm. With an embodiment of the present invention, iterative schemes measure the objective function at each step and use the information to guide the exploration in the direction of maximizing or minimizing the objective function. Therefore, the number of iterations may be highly dependent on the objective function contour.

An objective function may represent a function that maps an event or values of one or more variables onto a real number. The function may represent an objective with a desire to maximize or minimize. For a 2-dimensional objective function, the x-axis and y-axis may represent the 2-dimensional inputs and the z-axis may represent the objective function values. In this example, the goal of the optimization problem may be to find the minimum which would result in values (0, 0). An optimization algorithm attempts to find this result without evaluating every combination of inputs. The shape of an objective function may be complex particularly in higher dimensions and may be unknown. The shape of the objective function may represent one of the drivers of the number of iterations used to find a minimum or maximum.

Bounds and constraints of Grid or Random search techniques may also be applied to iterative schemes. A key difference is taking advantage of the opportunity to inject information derived from a metric calculated based on the automated test results. In the Equation below, $\Delta x^{(k)}$ would include the influence of an objective function to drive the sampling in subsequent iterations.

$$x^{(k+1)} = x^{(k)} \Delta x^{(k)}; k=0,1,2,\ldots$$

This Equation represents an algorithm form for iterative sampling.

According to an embodiment of the present invention, optimization algorithms applied to this iterative condition exploration may include metaheuristic methods. In addition, these types of algorithms may include Differential Evolution that make few or no assumptions about the problem being optimized. Other applicable optimization techniques or algorithms may place requirements on the shape of the objective function, which may be unknown since the approach samples the function itself at each iteration.

Figure 3:
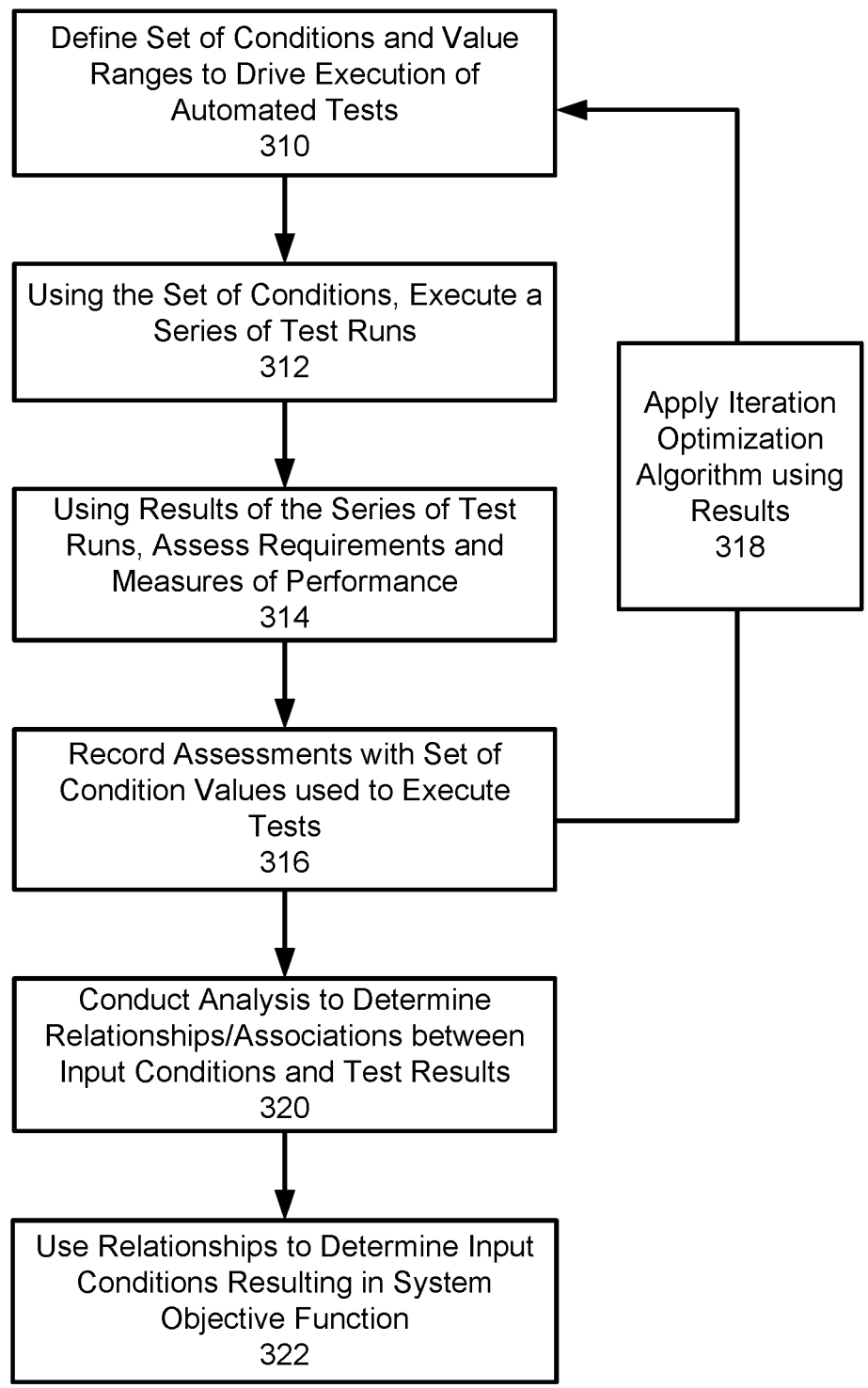
FIG. 3 is an exemplary flowchart, according to an embodiment of the present invention.

FIG. 3 is an exemplary flowchart, according to an embodiment of the present invention. At step 310, a set of conditions and value ranges may be defined to drive execution of automated tests. At step 312, using the set of conditions, a series of test runs may be executed. At step 314, using the results of the series of test runs, an embodiment of the present invention may assess requirements and measures of performance. At step 316, assessments may be recorded with a set of condition values used to execute the tests. At step 318, an iteration optimization algorithm may be applied using the results. At step 320, analysis may be conducted to determine relationships between input conditions and test results. At step 322, the relationships may be used to determine input conditions resulting in system objective function. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 310, a set of conditions and value ranges may be defined to drive execution of automated tests. The set of conditions may include a variety of types including continuous, discrete or categorical variables. For continuous variables, the conditions may be binned or sampled to create finite set of regions to analyze. An example of a condition for an aircraft system may be altitude where values may range from 0 to over 50,000 feet. A sampling scheme may be applied to the input condition space. Sampling schemes may include Grid or Random sampling, for example. Other sampling schemes and binned approaches may be applied.

At step 312, using the set of conditions, a series of test runs may be executed. The series of test runs may be executed on an Automated Test and Re-Test (ATRT) system, as described in U.S. Pat. Nos. 8,826,084; 9,135,714; 9,983,965 and 10,678,666, the contents of which are incorporated by reference. ATRT process and suite of technologies address automated testing of large complex systems and systems-of-systems. ATRT systems reduce time and effort involved in conducting system integration and testing while expanding the depth and breadth of test requirement coverage. In addition, ATRT systems may provide automated test and retesting in a virtual test environment. ATRT systems may also support rules-based virtual users for a specific system through the creation, composition and automated execution of a set of user defined rules. Virtual users may provide complexity management and higher test coverage of a system under test due to an ability to take different paths to reach the same goal. Other automated systems may be implemented.

At step 314, using the results of the series of test runs, an embodiment of the present invention may assess requirements and measures of performance. The requirements may be consistent with an objective function which may relate to identifying system failures, sensitivities, etc. The objective function may also relate to a specific performance metric, condition or characteristic. In an automated execution environment, input condition space may be explored based on a defined objective function. An exemplary system requirement may describe how a system is implemented (e.g., a system may have the ability to perform engagements). An example of a measure of performance may represent a comparison between an achieved result and a desired result (e.g., measure a system's ability to perform 10 engagements in 10 seconds).

At step 316, assessments may be recorded with a set of condition values used to execute the tests. The assessments may be stored and managed in a storage component, database, datastore, cloud storage, remote storage, local storage, etc.

At step 318, an iteration optimization algorithm may be applied using the results. The iteration optimization algorithm may be based on artificial intelligence, machine learning and/or mathematical techniques. For example, the iteration optimization algorithm may be applied at each step to analyze an objective function and derive a set of condition values in the next iteration. Accordingly, the results of previous test instances may be used as a source of information to explore condition space of subsequent test runs pursuant to an overall objective function. An embodiment of the present invention strategically explores the input condition space based on test results using an optimization algorithm. Optimization algorithms may be based on metaheuristic methods, differential evolution, etc.

At step 320, analysis may be conducted to determine relationships/associations between input conditions and test results. The analysis may be supported by algorithms, such as logistic regression, mutual information, etc. In addition, certain condition values may be identified. For example, condition values may be identified with binned variants of the algorithms. Condition values may be binned prior to being analyzed. For example, an input variable ranging from 0 to 100 may be binned to [low, medium, high] where low is [0-25], medium is (25-75] and high is (75-100]. Other variations and levels of granularity may be applied.

At step 322, the relationships may be used to determine input conditions resulting in system objective function. Relationships/associations may be used by system designers to account for combinations of input conditions resulting in an system behavior, e.g., an unexpected system behavior, large number of failures, type of system failure, a specific condition, performance or metric, etc. Relationships between input conditions and test results may vary in complexity. For example, a specific failure may be connected to a single input condition, multiple conditions, range of values across one or more conditions as well as other variations/combinations. In addition, relationships may be probabilistic where as a certain condition value is approached, the likelihood of a particular result may increase. Other variations in complexity may be identified and uncovered.

FIG. 4 is an exemplary system diagram, according to an embodiment of the present invention. System 410 executes and supports condition analysis and exploration through various configurations and architectures. Mobile Device 402 may communicate with System 410 via Network 412. In addition, Mobile Device 402 may be integrated with System 410 where processing occurs on the mobile device itself. System 410 may communicate and integrate with various other devices represented by Device 404.

System 410 may include User Interface 420 that supports various interactions on devices including mobile devices, other devices, computers, laptops, tablets, etc. User Interface 420 may enable users and/or other entities to interact with Engine/Processor 422. User Interface 420 may support various applications including browsers, mobile interfaces, dashboards, interactive interfaces, etc.

User Interface 420 may display information relating to input conditions, test results and identified relationships in a graphical interactive view. For example, User Interface 420 may display relative importance of a subset of binned conditions. This may be illustrated as a graphic that illustrates a set of coefficients and their relative importance. User Interface 420 may also provide test results in real-time and provide information relating to automated systems that perform the tests. The graphical user interface may also enable a user to modify and/or update certain conditions, testing data as well as other inputs.

Engine/Processor 422 may support various functions and processes via modules including Input Conditions 424, Sample/Binned 426, Objective Function 428, Optimization 430, Analysis 432, Relationship 434, Interface/API 436, Test Results 438, etc. Other functions and features may be supported in various forms and implementations.

Input Conditions 424 may receive a set of conditions and value ranges. The set of conditions may include various types including continuous, discrete as well as categorical. Some conditions may be sampled or binned to generate a finite set of regions, as represented by Sample/Binned 426.

Objective Function 428 may identify a system objective function including system failure or other performance goal, metric, condition, etc.

Optimization 430 supports and executes an iterative optimization algorithm that may be based on artificial intelligence, machine learning and/or mathematical techniques. The iteration optimization algorithm may further analyze an objective function and derive a set of condition values for a subsequent iteration. In addition, the iterative optimization algorithm may be based on metaheuristic methods, differential evolution, etc.

Analysis 432 may perform analysis based on input conditions and test results. The analysis may be used to identify relationship or association information, as shown by 434.

Interface/API 436 may communicate with various systems including ATRT System 450 where test results may be received as represented by Test Results 438. ATRT System 450 may support various interactions with other devices, represented by 406 through Network 414. Interface/API 436 may communicate with various other Automated Systems represented by 452.

System 410 may store and manage data in various formats, including Databases 440, 442. Data may relate to input conditions, value ranges, objective functions, test results, relationships/associations, analytics, etc. System 410 may be communicatively coupled to Databases 440, 442. Databases 440, 442 may include any suitable data structure to maintain the information and allow access and retrieval of the information. Databases 440, 442 may be any suitable storage device or devices. The storage may be local, remote, or a combination thereof with respect to Databases 440, 442. Databases 440, 442 may have back-up capability built-in. Communications with Databases 440, 442 may be over a network, or communications may involve a direct connection between Databases 440, 442 and System 410, as depicted in FIG. 4. Databases 440, 442 may also represent cloud or other network based storage.

Networks 412, 414, may be a wireless network, a wired network or any combination of wireless network and wired network. Although Networks 412, 414 is depicted as one network for simplicity, it should be appreciated that according to one or more embodiments, Networks 412, 414 may comprise a plurality of interconnected networks, such as, for example, a service provider network, the Internet, a cellular network, corporate networks, or even home networks, or any of the types of networks mentioned above. Data may be transmitted and received via Networks 412, 414 utilizing a standard networking protocol or a standard telecommunications protocol.

While FIG. 4 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals.

The system 400 of FIG. 4 may be implemented in a variety of ways. Architecture within system 400 may be implemented as hardware components (e.g., module) within one or more network elements. It should also be appreciated that architecture within system 400 may be implemented in computer executable software (e.g., on a tangible, non-transitory computer-readable medium) located within one or more network elements. Module functionality of architecture within system 400 may be located on a single device or distributed across a plurality of devices including one or more centralized servers and one or more mobile units or end user devices. The architecture depicted in system 400 is meant to be exemplary and non-limiting. For example, while connections and relationships between the elements of system 400 are depicted, it should be appreciated that other connections and relationships are possible. The system 400 described below may be used to implement the various methods herein, by way of example. Various elements of the system 400 may be referenced in explaining the exemplary methods described herein.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements condition analysis and exploration workflow, the system comprising:
   a memory component; and
   a computer server coupled to the memory component, the computer server comprising a programmed computer processor configured to perform the steps of:
      defining a set of input conditions and value ranges to drive execution of one or more automated tests;
      initiating execution of a series of test runs, via the programmed computer processor, using the set of input conditions and the value ranges on an automated testing suite of tools, wherein the automated testing suite of tools executes the series of test runs to provide automated test and retesting in a virtual test environment;
      using test results of the execution of the series of test runs, generating assessments relating to one or more requirements and measures of performance;
      recording, via the memory component, the assessments and the set of input conditions;
      executing, via the programmed computer processor, an iterative optimization algorithm to analyze an objective function and derive a next set of condition values, wherein a number of iterations performed by the iterative optimization algorithm is driven by a sampling scheme or a shape of the objective function; and responsive to the execution of the iterative optimization algorithm, automatically identifying one or more relationships between the set of input conditions and the test results.

2. The system of claim 1, wherein the set of input conditions comprise continuous, discrete or categorical.

3. The system of claim 1, wherein the set of input conditions are binned to create a finite set of regions.

4. The system of claim 1, further comprising:
an interactive user interface that displays relative importance of one or more condition coefficients.

5. The system of claim 1, wherein the set of input conditions are sampled using grid or random sampling.

6. The system of claim 1, wherein the iterative optimization algorithm is applied using a metaheuristic method.

7. The system of claim 1, wherein the one or more relationships comprises determining a failure occurs when a single input condition is above or below a threshold by a predetermined value.

8. The system of claim 1, wherein the set of input conditions results in an unexpected system behavior.

9. The system of claim 1, wherein the automated testing suite of tools comprise an automated test and retest system (ATRT).

10. A method that implements condition analysis and exploration workflow, the method comprising the steps of:
defining, via a computer processor, a set of input conditions and value ranges to drive execution of one or more automated tests;
initiating, via the computer processor, execution of a series of test runs using the set of input conditions and the value ranges on an automated testing suite of tools, wherein the automated testing suite of tools executes the series of test runs to provide automated test and retesting in a virtual test environment;
using test results of the execution of the series of test runs, generating assessments relating to one or more requirements and measures of performance;
recording, via a memory component, the assessments and the set of input conditions;
executing, via the computer processor, an iterative optimization algorithm to analyze an objective function and derive a next set of condition values, wherein a number of iterations performed by the iterative optimization algorithm is driven by a sampling scheme or a shape of the objective function; and
responsive to the execution of the iterative optimization algorithm, automatically identifying, via the computer processor, one or more relationships between the set of input conditions and the test results.

11. The method of claim 10, wherein the set of input conditions comprise continuous, discrete or categorical.

12. The method of claim 10, wherein the set of input conditions are binned to create a finite set of regions.

13. The method of claim 10, wherein an interactive user interface displays relative importance of one or more condition coefficients.

14. The method of claim 10, wherein the set of input conditions are sampled using grid or random sampling.

15. The method of claim 10, wherein the iterative optimization algorithm is applied using a metaheuristic method.

16. The method of claim 10, wherein the one or more relationships comprises determining a failure occurs when a single input condition is above or below a threshold by a predetermined value.

17. The method of claim 10, wherein the set of input conditions results in an unexpected system behavior.

18. The method of claim 10, wherein the automated testing suite of tools comprise an automated test and retest system (ATRT).

* * * * *